United States Patent
Heikkinen et al.

(10) Patent No.: US 10,487,179 B2
(45) Date of Patent: Nov. 26, 2019

(54) METHOD OF MAKING A SILOXANE POLYMER COMPOSITION

(71) Applicant: Inkron Oy, Espoo (FI)

(72) Inventors: Jarkko Heikkinen, Espoo (FI); Juha Rantala, Espoo (FI)

(73) Assignee: Inkron Oy, Espoo (FI)

( * ) Notice: Subject to any disclaimer, the term of this patent is extended or adjusted under 35 U.S.C. 154(b) by 0 days.

(21) Appl. No.: 15/319,813

(22) PCT Filed: Jun. 22, 2015

(86) PCT No.: PCT/FI2015/050457
§ 371 (c)(1),
(2) Date: Dec. 19, 2016

(87) PCT Pub. No.: WO2015/193558
PCT Pub. Date: Dec. 23, 2015

(65) Prior Publication Data
US 2017/0152350 A1    Jun. 1, 2017

Related U.S. Application Data
(60) Provisional application No. 62/014,136, filed on Jun. 19, 2014.

(30) Foreign Application Priority Data

Jun. 19, 2014    (FI) ..................... 20145600

(51) Int. Cl.
| | |
|---|---|
| *C08F 2/46* | (2006.01) |
| *C08F 2/50* | (2006.01) |
| *C08G 61/04* | (2006.01) |
| *C08G 77/18* | (2006.01) |
| *C08L 83/06* | (2006.01) |
| *C08K 3/08* | (2006.01) |
| *C08K 3/22* | (2006.01) |
| *C08L 83/04* | (2006.01) |
| *C08G 77/08* | (2006.01) |
| *C08G 77/50* | (2006.01) |
| *C08K 3/00* | (2018.01) |
| *C08G 77/14* | (2006.01) |
| *C08G 77/00* | (2006.01) |

(52) U.S. Cl.
CPC .............. *C08G 77/18* (2013.01); *C08G 77/08* (2013.01); *C08G 77/50* (2013.01); *C08K 3/00* (2013.01); *C08K 3/08* (2013.01); *C08K 3/22* (2013.01); *C08L 83/04* (2013.01); *C08L 83/06* (2013.01); *C08G 77/14* (2013.01); *C08G 77/80* (2013.01); *C08K 2003/0806* (2013.01); *C08K 2003/2206* (2013.01); *C08K 2201/001* (2013.01); *C08K 2201/005* (2013.01); *C08K 2201/011* (2013.01)

(58) Field of Classification Search
CPC ........ C08G 77/18; C08G 77/08; C08G 77/50; C08G 77/80; C08G 77/14; C08L 33/06; C08L 83/06; C08L 83/04; C08K 2201/005; C08K 2201/001; C08K 2201/011; C08K 3/00; C08K 3/22; C08K 3/08; C08K 2003/2206
USPC ........................................... 522/99, 1; 520/1
See application file for complete search history.

(56) References Cited

U.S. PATENT DOCUMENTS

| | | |
|---|---|---|
| 6,284,829 B1 | 9/2001 | Dalbe et al. |
| 2003/0105207 A1 | 6/2003 | Kleyer et al. |
| 2005/0244658 A1 | 11/2005 | Bae et al. |
| 2010/0178478 A1 | 7/2010 | Bae et al. |
| 2012/0276717 A1 | 11/2012 | Furuya et al. |
| 2014/0051821 A1 | 2/2014 | Popall et al. |

(Continued)

FOREIGN PATENT DOCUMENTS

| | | | |
|---|---|---|---|
| CN | 103059573 | * | 4/2013 |
| CN | 103059573 A | | 4/2013 |
| EP | 1464675 A2 | | 10/2004 |

(Continued)

OTHER PUBLICATIONS

Gao et al, CN 103059573 Machine Translation, Apr. 24, 2013 (Year: 2013).*

(Continued)

*Primary Examiner* — Jessica Whiteley
(74) *Attorney, Agent, or Firm* — Seppo Laine Oy (57) ABSTRACT

A siloxane polymer is made by providing a first compound having the chemical formula $SiR^1_aR^2_{4-a}$ where a is from 1 to 3, $R^1$ is a reactive group, and $R^2$ is an alkyl group or an aryl group, and providing a second compound having the chemical formula $SiR^3_bR^4_cR^5_{4-(b+c)}$ where $R^3$ is a cross-linking functional group, $R^4$ is a reactive group, and $R^5$ is an alkyl or aryl group, and where b=1 to 2, and c=1 to (4−b). The first and second compounds are polymerized together to form a siloxane polymer. The siloxane polymer can be then used in a final composition where the siloxane polymer comprises from 5 to 100% by weight, and filler (e.g. microparticles, nanoparticles, nanowires, etc.) comprises from zero to 95% by weight. The siloxane polymer composition is useful in a variety of areas such as an adhesive, e.g. as a die attach adhesive in semiconductor (e.g. LED) packaging applications, encapsulants, optical coatings, protective coatings, and other applications.

15 Claims, 3 Drawing Sheets

(56) References Cited

U.S. PATENT DOCUMENTS

2014/0100301 A1    4/2014  Lin et al.

FOREIGN PATENT DOCUMENTS

| JP | 2008189917 A | 8/2008 |
| JP | 2010037538 A | 2/2010 |
| JP | 2011079927 A | 4/2011 |
| JP | 2014510159 A | 4/2014 |
| WO | WO2006112591 A1 | 10/2006 |
| WO | WO2007001039 A1 | 1/2007 |
| WO | WO2008046142 A1 | 4/2008 |

OTHER PUBLICATIONS

Jin J et al: Silica nanoprticle-embedded sol-gel organic/inorganic hybrid nanocomposite for transparent OLED encapsulation. Organic Electronics, 2012, vol. 13, pp. 53-57.
Denver H. et al, Fabrication of polydimethylsiloxane composites with nickle nanoparticle and nanowire fillers and study of their mechanical and magnetic properties, 2009, Journal of Applied Physics, vol. 186, No. 6, 106, 064909.

* cited by examiner

METHOD OF MAKING A SILOXANE POLYMER COMPOSITION

TECHNICAL FIELD

The present invention relates to siloxane polymer compositions. In particular the present invention concerns a method of making siloxane polymer composition which may be useful in a variety of areas such as an adhesive, e.g. as a die attach adhesive in semiconductor (e.g. LED) packaging applications, encapsulants, optical coatings, protective coatings, and other applications.

BACKGROUND

Methods of producing siloxane polymers containing nanoparticles are disclosed in Jin, J et al., Organic Electronic, 2012, Vol. 13, pp. 53-57.

Background art is also disclosed in US 2014010030, CN 103059573, WO 2006112591, WO 2007001039, WO 2008046142, US 20100178478, and US 20050244658.

The known compositions when used as one component adhesives need to be shipped and stored at low temperatures to avoid premature cross-linking. It would be desired to have compositions which can be shipped and stored at room temperature without substantial polymerization or other unwanted reactions taking place.

SUMMARY OF THE INVENTION

It is an aim of the present invention to remove at least a part of the problems of the art.

It is an aim of the present invention to provide a novel method of producing for producing siloxane polymer materials.

In an embodiment, a first compound is provided having the chemical formula $SiR^1{}_a R^2{}_{4-a}$ where a is from 1 to 3, $R^1$ is a reactive group, and $R^2$ is an alkyl group or an aryl group. A second compound is also provided that has the chemical formula $SiR^3{}_b R^4{}_c R^5{}_{4-(b+c)}$ where $R^3$ is a cross-linking functional group, $R^4$ is a reactive group, and $R^5$ is an alkyl or aryl group, and where b=1 to 2, and c=1 to (4−b).

The first and second compounds are polymerized together to form a siloxane polymeric material. The siloxane material can be mixed with metal, semi-metal or ceramic particle having an average particle size of less than 100 microns, as well as other optional coupling agents.

More specifically, the present invention is characterized by what is stated in the characterizing parts of the independent claims.

Considerable advantages are obtained. Thus, the siloxane-particle composition can be used in a variety of areas. It can be used as an adhesive or encapsulant in electronics or optoelectronics packaging, LED and OLED front and back end processing, 3D, photovoltaic and display metallization, in place of soldering e.g. solder bumps in semiconductor packaging, printed electronics, OLED low work function cathode ink, ITO replacement ink, metal mesh and other electrodes, high resolution photovoltaic paste, LMO cathode paste, photovoltaics, power electronics and EMI, touch sensor and other displays, heat or UV curable encapsulants or dielectrics, to name a few.

BRIEF DESCRIPTION OF THE DRAWINGS

Example embodiments will be more clearly understood from the following detailed description taken in conjunction with the accompanying drawings, in which.

DESCRIPTION OF EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will also be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It is noted that, as used herein, the singular forms of "a", "an" and "the" include plural referents unless the context clearly dictates otherwise. It will be further understood that the term "comprises" and/or "comprising", when used in this specification, specify the presence of stated features, steps, operations, elements, and/or components, but do not preclude the addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The lower case letters used in the below formulas stand in particular for integers.

Figure 1:
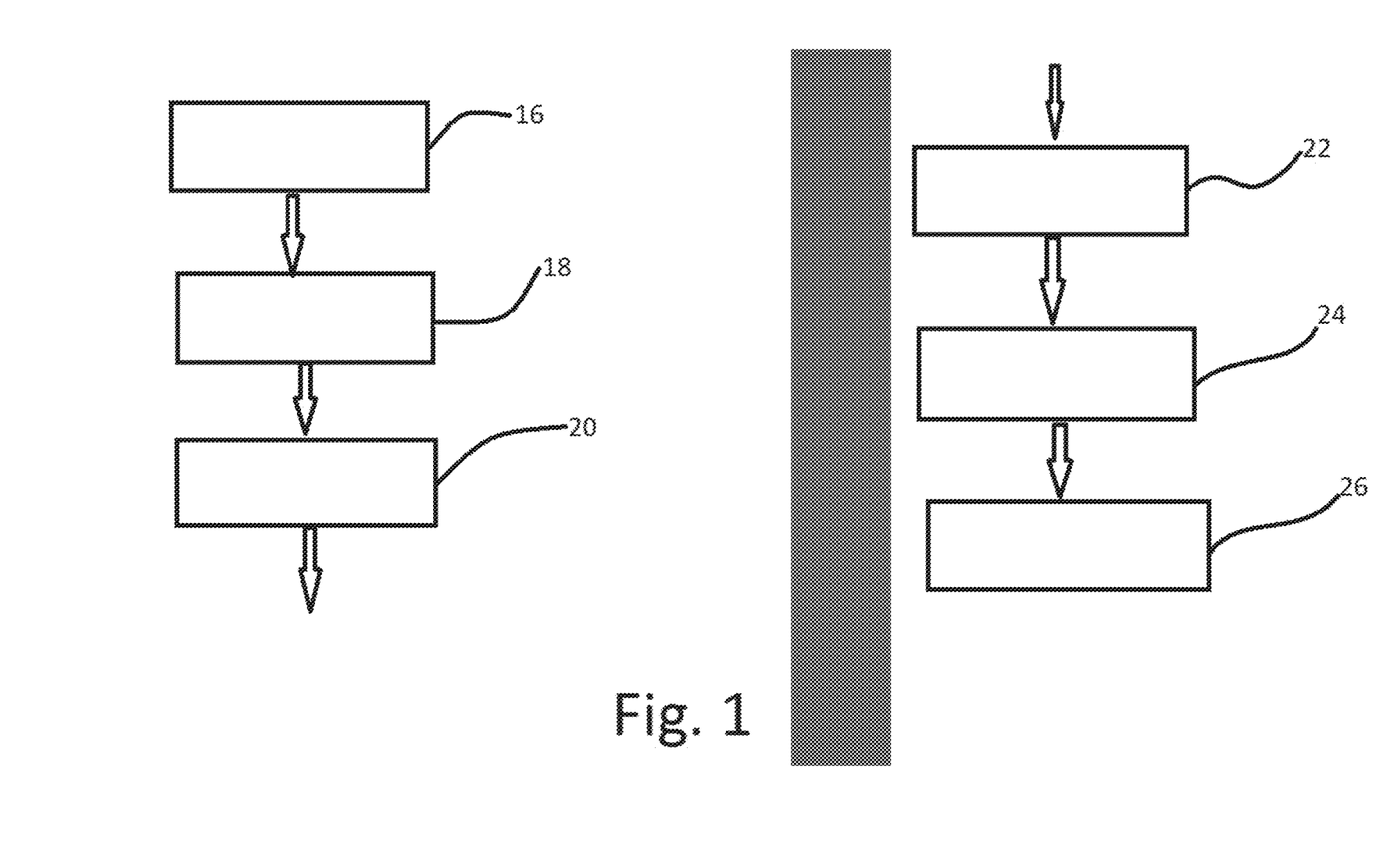
FIG. 1 illustrates an exemplary method of making a siloxane polymer composition.

As can be seen in FIG. 1, at (16) a first compound is provided having a chemical formula $SiR^1{}_aR^2{}_{4-a}$ wherein a is from 1 to 3, $R^1$ is a reactive group, and $R^2$ is an alkyl group or an aryl group.

At (18) in FIG. 1, a second compound is provided that has the chemical formula $SiR^3{}_bR^4{}_cR^5{}_{4-(b+c)}$ where $R^3$ is a cross-linking functional group, $R^4$ is a reactive group, and $R^5$ is an alkyl or aryl group, and where b=1 to 2, and c=1 to (4-b).

At (20) an optional third compound is provided along with the first and second compounds, to be polymerized therewith. The third compound may have the chemical formula $SiR^9{}_fR^{10}{}_g$ wherein $R^9$ is a reactive group and f=1 to 4, and where $R^{10}$ is an alkyl or aryl group and g=4-f.

The first, second and third compounds may be provided in any sequence, and oligomeric partially polymerized versions of any of these compounds may be provided in place of the above-mentioned monomers.

As can be seen at (22) in FIG. 1, a catalyst is provided. The catalyst may be a base catalyst, or other catalyst as mentioned below. The catalyst provided should be capable of polymerizing the first and second compounds together. As mentioned above, the order of the addition of the compounds and catalyst may be in any desired order. As can be seem at (24), the various components provided together are polymerized to create a siloxane polymeric material having the desired molecular weight and viscosity. At (24), particles, such as microparticles, nanoparticles or other desired particles are added, along with other optional components such as coupling agents, catalyst, stabilizers, adhesion promoters, and the like. Parts of the process (22) and (24) can be performed in any desired order.

Thus, in one example, a siloxane polymer is made by polymerizing first and second compounds, where the first compound has the chemical formula wherein
a is from 1 to 3,
$R^1$ is a reactive group, and
$R^2$ is an alkyl group or an aryl group,
and the second compound has the chemical formula wherein
$R^3$ is a cross-linking functional group,
$R^4$ is a reactive group, and
$R^5$ is an alkyl or aryl group, and
where b=1 to 2, and c=1 to (4-b).

The first, second and third compounds, and any compounds recited hereinbelow, if such compounds have more than one of a single type of "R" group such as a plurality of aryl or alkyl groups, or a plurality of reactive groups, or a plurality of cross-linking functional groups, etc., the multiple R groups are independently selected so as to be the same or different at each occurrence. For example, if the first compound is $SiR^1{}_2R^2{}_2$, the multiple $R^1$ groups are independently selected so as to be the same or different from each other. Likewise the multiple $R^2$ groups are independently selected so as to be the same or different from each other. The same is for any other compounds mentioned herein, unless explicitly stated otherwise.

The first compound may have from 1 to 3 alkyl or aryl groups ($R^2$) bound to the silicon in the compound. A combination of different alkyl groups, a combination of different aryl groups, or a combination of both alkyl and aryl groups is possible. If an alkyl group, the alkyl contains preferably 1 to 18, more preferably 1 to 14 and particularly preferred 1 to 12 carbon atoms. Shorter alkyl groups, such as from 1 to 6 carbons (e.g. from 2 to 6 carbon atoms) are envisioned.

The alkyl group can be branched at the alpha or beta position with one or more, preferably two, C1 to C6 alkyl groups. In particular, the alkyl group is a lower alkyl containing 1 to 6 carbon atoms, which optionally bears 1 to 3 substituents selected from methyl and halogen. Methyl, ethyl, n-propyl, i-propyl, n-butyl, i-butyl and t-butyl, are particularly preferred. A cyclic alkyl group is also possible like cyclohexyl, adamantyl, norbornene or norbornyl.

If $R^2$ is an aryl group, the aryl group can be phenyl, which optionally bears 1 to 5 substituents selected from halogen, alkyl or alkenyl on the ring, or naphthyl, which optionally bear 1 to 11 substituents selected from halogen alkyl or alkenyl on the ring structure, the substituents being optionally fluorinated (including per-fluorinated or partially fluorinated). If the aryl group is a polyaromatic group, the polyaromatic group can be for example anthracene, naphthalene, phenanthere, tetracene which optionally can bear 1-8 substituents or can be also optionally 'spaced' from the silicon atom by alkyl, alkenyl, alkynyl or aryl groups containing 1-12 carbons. A single ring structure such as phenyl may also be spaced from the silicon atom in this way.

The siloxane polymer is made by performing a polymerization reaction, preferably a base catalyzed polymerization reaction between the first and second compounds. Optional additional compounds, as set forth below, can be included as part of the polymerization reaction.

The first compound can have any suitable reactive group $R^1$, such as a hydroxyl, halogen, alkoxy, carboxyl, amine or acyloxy group. If, for example, the reactive group in the first compound is an —OH group, more particular examples of the first compound can include silanediols such as diphenylsilanediol, dimethylsilanediol, di-isopropylsilanediol, di-n-propylsilanediol, di-n-butylsilanediol, di-t-butylsilanediol, di-isobutylsilanediol, phenylmethylsilanediol and dicyclohexylsilanediol among others.

The second compound can have any suitable reactive group $R^4$, such as a hydroxyl, halogen, alkoxy, carboxyl, amine or acyloxy group, which can be the same or different from the reactive group in the first compound. In one example, the reactive group is not —H in either the first or second compound (or any compounds that take part in the polymerization reaction to form the siloxane polymer—e.g. the third compound, etc.), such that the resulting siloxane polymer has an absence of any, or substantially any, H groups bonded directly to the Si in the siloxane polymer.

Group $R^5$, if present at all in the second compound, is independently an alkyl or aryl groups such as for group $R^2$ in the first compound. The alkyl or aryl group $R^5$ can be the same or different from the group $R^2$ in the first compound.

The cross-linking reactive group $R^3$ of the second compound can be any functional group that can be cross-linked by acid, base, radical or thermal catalyzed reactions. These functional groups can be for example any epoxide, amine, allyl, anhydride, oxetane, acrylate, alkenyl, alkynyl or thiol group.

If an epoxide group, it can be a cyclic ether with three ring atoms that can be cross-linked using acid, base and thermal catalyzed reactions. Examples of these epoxide containing cross-linking groups are glycidoxypropyl and (3,4-Epoxycyclohexyl)ethyl groups to mention few If an oxetane group, it can be a cyclic ether with four ring atoms that can be cross-linked using acid, base and thermal catalyzed reactions. Examples of such oxetane containing silanes include 3-(3-ethyl-3-oxetanylmethoxy)propyltriethoxysilane, 3-(3-Methyl-3-oxetanylmethoxy) propyltriethoxysilane, 3-(3-ethyl-3-oxetanylmethoxy)propyltrimethoxysilane or 3-(3-Methyl-3-oxetanylmethoxy) propyltrimethoxysilane, to mention a few.

If an alkenyl group, such a group may have preferably 2 to 18, more preferably 2 to 14 and particularly preferred 2 to 12 carbon atoms. The ethylenic, i.e. two carbon atoms bonded with double bond, group is preferably located at the position 2 or higher, related to the Si atom in the molecule. Branched alkenyl is preferably branched at the alpha or beta position with one and more, preferably two, C1 to C6 alkyl, alkenyl or alkynyl groups, optionally fluorinated or per-fluorinated alkyl, alkenyl or alkynyl groups.

If an alkynyl group, it may have preferably 2 to 18, more preferably 2 to 14 and particularly preferred 2 to 12 carbon atoms. The ethylinic group, i.e. two carbon atoms bonded with triple bond, group is preferably located at the position 2 or higher, related to the Si or M atom in the molecule. Branched alkynyl is preferably branched at the alpha or beta position with one and more, preferably two, C1 to C6 alkyl, alkenyl or alkynyl groups, optionally per-fluorinated alkyl, alkenyl or alkynyl groups.

If a thiol group, it may be any organosulfur compound containing carbon-bonded sulfhydryl group. Examples of thiol containing silanes are 3-mercaptopropyltrimethoxysilane and 3-mercaptopropyltriethoxysilane.

The reactive group in the second compound can be an alkoxy group. The alkyl residue of the alkoxy groups can be linear or branched. Preferably, the alkoxy groups are comprised of lower alkoxy groups having 1 to 6 carbon atoms, such as methoxy, ethoxy, propoxy and t-butoxy groups. A particular examples of the second compound is an silane, such as 2-(3,4-Epoxycyclohexyl) ethyltrimethoxysilane, 2-(3,4-epoxycyclohexyl)ethyltriethoxysilane, 3-(Trimethoxysilyl)propylmethacrylate, 3-(Trimethoxysilyl)propylacrylate, (3-glycidyloxypropyl)trimethoxysilane, or 3-glycidoxypropyltriethoxysilane, 3-methacryloxypropyltrimethoxysilane, 3-acryloxypropyltrimethoxysilane, among others.

A third compound may be provided along with the first and second compounds, to be polymerized therewith. The third compound may have the chemical formula wherein
$R^9$ is a reactive group and
f=1 to 4, and where
$R^{10}$ is an alkyl or aryl group and
g=4−f.

One such example is tetramethoxysilane. Other examples include phenylmethyldimethoxysilane, trimethylmethoxysilane, dimethyldimethoxysilanesilane, vinyltrimethoxysilane, allyltrimethoxysilane, methyltrimethoxysilane, methyltriethoxysilane, methyl tripropoxysilane, propylethyltrimethoxysilane, ethyltriethoxysilane, vinyltrimethoxysilane, vinyltriethoxysilane, among others.

Though the polymerization of the first and second compounds can be performed using an acid catalyst, a base catalyst is preferred. The base catalyst used in a base catalyzed polymerization between the first and second compounds can be any suitable basic compound. Examples of these basic compounds are any amines like triethylamine and any barium hydroxide, like barium hydroxide, barium hydroxide monohydrate, barium hydroxide octahydrate, among others. Other basic catalysts include magnesium oxide, calcium oxide, barium oxide, ammonia, ammonium perchlorate, sodium hydroxide, potassium hydroxide, imidazone or n-butyl amine. In one particular example the base catalyst is $Ba(OH)_2$. The base catalyst can be provided, relative to the first and second compounds together, at a weight percent of less than 0.5%, or at lower amounts such as at a weight percent of less than 0.1%.

Polymerization can be carried out in melt phase or in liquid medium. The temperature is in the range of about 20 to 200° C., typically about 25 to 160° C., in particular about 40 to 120° C. Generally polymerization is carried out at ambient pressure and the maximum temperature is set by the boiling point of any solvent used. Polymerization can be carried out at refluxing conditions. Other pressures and temperatures are also possible. The molar ratio of the first compound to the second compound can be 95:5 to 5:95, in particular 90:10 to 10:90, preferably 80:20 to 20:80. In a preferred example, the molar ratio of the first compound to the second compound (or second plus other compounds that take part in the polymerization reaction—see below) is at least 40:60, or even 45:55 or higher.

In one example, the first compound has —OH groups as the reactive groups and the second compound has alkoxy groups as the reactive groups. Preferably, the total number of —OH groups for the amount of the first compound added is not more than the total number of reactive groups, e.g. alkoxy groups in the second compound, and preferably less than the total number of reactive groups in the second compound (or in the second compound plus any other compounds added with alkoxy groups, e.g. an added tetramethoxysilane or other third compound involved in the polymerization reaction, ad mentioned herein). With the alkoxy groups outnumbering the hydroxyl groups, all or substantially all of the —OH groups will react and be removed from the siloxane, such as methanol if the alkoxysilane is a methoxysilane, ethanol if the alkoxysilane is ethoxysilane, etc. Though the number of —OH groups in the first compound and the number of the reactive groups in the second compound (preferably other than —OH groups) can be substantially the same, it is preferably that the total number of reactive groups in the second compound outnumber the —OH groups in the first compound by 10% or more, preferably by 25% or more. In some embodiments the number of second compound reactive groups outnumber the first compound —OH groups by 40% or more, or even 60% or more, 75% or more, or as high as 100% or more. The methanol, ethanol or other byproduct of the polymerization reaction depending upon the compounds selected, is removed after polymerization, preferably evaporated out in a drying chamber.

The obtained siloxane polymers have any desired (weight average) molecular weight, such as from 500 to 100,000 g/mol. The molecular weight can be in the lower end of this range (e.g., from 500 to 10,000 g/mol, or more preferably 500 to 8,000 g/mol) or the organosiloxane material can have a molecular weight in the upper end of this range (such as from 10,000 to 100,000 g/mol or more preferably from 15,000 to 50,000 g/mol). It may be desirable to mix a polymer organosiloxane material having a lower molecular weight with an organosiloxane material having a higher molecular weight.

The composition of obtained polymer can be further adjusted to achieve to results good adhesion after final cure. This adhesion can be either on filler which will be mixed with polymer or substrate where the polymer will be applied. To achieve good adhesion, silanes with good adhesion properties are used during polymer manufacturing. Compounds with polar groups like hydroxyl, epoxy, carboxylic, anhydride or amine groups are examples of silanes which have good adhesion properties on various substrates.

The obtained siloxane polymer may then be combined with additional components depending upon the final desired use of the polymer. Preferably, the siloxane polymer is combined with a filler to form a composition, such as a particulate filler having particles with an average particle size of less than 100 microns, preferably less than 50 microns, including less than 20 microns. Additional components may be part of the composition, such as catalysts or curing agents, one or more coupling agents, dispersants, antioxidants, stabilizers, adhesion promoters, and/or other desired components depending upon the final desired use of the siloxane material.

In one example, a reducing agent that can reduce an oxidized surface to its metallic form, is included. A reducing agent can remove oxidation from particles if they are metallic particles with surface oxidation, and/or remove oxidation from e.g. metallic bonding pads or other metallic or electrically conductive areas that have oxidized, so as to improve the electrical connection between the siloxane particle material and the surface on which it is deposited or adhered. Reducing or stabilization agents can include ethylene glycol, beta-D-glucose, poly ethylene oxide, glycerol, 1,2-propylene glycol, N,N dimethyl formamide, poly-sodium acyrylate (PSA), betacyclodextrin with polyacyrylic acid, dihydroxy benzene, poly vinyl alcohol, 1,2-propylene glycol, hydrazine, hydrazine sulfate, Sodium borohydride, ascorbic acid, hydroquinone family, gallic acid, pyrogallol, glyoxal, acetaldehyde, glutaraldehyde, aliphatic dialdehyde family, paraformaldehyde, tin powder, zinc powder, formic acid. An additive such as a stabilization agent, e.g. an antioxidant such as Irganox (as mentioned hereinbelow) or a diazine derivative can also be added.

Cross-linking silicon or non-silicon based resins and oligomers can be used to enhance cross linking between siloxane polymers. The functionality of added cross-linking oligomer or resin is chosen by functionality of siloxane polymer. If for example epoxy based alkoxysilanes were used during polymerization of siloxane polymer, then epoxy functional oligomer or resin can be used. The epoxy oligomer or resin can be any di, tri, tetra, or higher functionality epoxy oligomer or resin. Examples of these epoxy oligomers or resins can be 1,1,3,3-tetramethyldisiloxane-1,3-bis2-(3,4-epoxycyclohexyl)ethyl, 1,1,3,3-tetramethyldisiloxane-1,3-bisglycidoxypropyl, Bis(3,4-epoxycyclohexylmethyl) adipate, 3,4-Epoxycyclohexylmethyl 3,4-epoxycyclohexanecarboxylate, 1,4-Cyclohexanedimethanol diglycidyl ether, Bisphenol A diglycidyl ether, Diglycidyl 1,2-cyclohexanedicarboxylate, to mention a few.

The curing agent added to the final formulation is any compound that can initiate and/or accelerate the curing process of functional groups in siloxane polymer. These curing agents can be either heat and/or UV activated (e.g. a thermal acid if the polymerization reaction is heat activated or a photoinitiator if UV activated). The cross-linking groups in the siloxane polymer, as mentioned above, are preferably selected from epoxide, oxetane, acrylate, alkenyl, alkynyl, vinyl and Si—H groups. The curing agent is selected based on the cross-linking group in the siloxane polymer.

In one embodiment, the curing agent for epoxy and oxetane groups can be selected from nitrogen-containing curing agents, such as primary and/or secondary amines which show blocked or decreased activity. The definition "primary or secondary amines which show blocked or decreased reactivity" shall mean those amines which due to a chemical or physical blocking are incapable or only have very low capability to react with the resin components, but may regenerate their reactivity after liberation of the amine, e.g. by melting it at increased temperature, by removing sheath or coatings, by the action of pressure or of supersonic waves or of other energy types, the curing reaction of the resin components starts.

Examples of heat-activatable curing agent include complexes of at least one organoborane or borane with at least one amine. The amine may be of any type that complexes the organoborane and/or borane and that can be decomplexed to free the organoborane or borane when desired. The amine may comprise a variety of structures, for example, any primary or secondary amine or polyamines containing primary and/or secondary amines. The organoborane can be selected from alkyl boranes. An example of these heat-activatable, particular preferred borane curing agents is boron trifluoride. Suitable amine/(organo)borane complexes are available from commercial sources such as King Industries, Air products, and ATO-Tech.

Other heat activated curing agents for epoxy groups are thermal acid generators which can release strong acids at elevated temperature to catalyze cross-linking reactions of epoxy. These thermal acid generators can be for example any onium salts like sulfonium and iodonium salts having complex anion of the type $BF_4^-$, $PF_6^-$, $SbF_6^-$, $CF_3SO_3^-$, and $(C_6F_5)_4B^-$. Commercial examples of these thermal acid generators are K-PURE CXC-1612 and K-PURE CXC-1614 manufactured by King Industries.

Additionally, with respect to epoxy and/or oxetane containing polymers, curing agent, co-curing agents, catalysts, initiators or other additives designed to participate in or promote curing of the adhesive formulation like for example, anhydrides, amines, imidazoles, thiols, carboxylic acids, phenols, dicyandiamide, urea, hydrazine, hydrazide, amino-formaldehyde resins, melamine-formaldehyde resins, quaternary ammonium salts, quaternary phosphonium salts, tri-aryl sulfonium salts, di-aryl iodonium salts, diazonium salts, and the like, can be used.

For acrylate, alkenyl and alkynyl cross linking groups curing agent can be either thermal or UV activated. Examples of thermal activated are peroxides and azo compounds. Peroxide is a compound containing unstable oxygen-oxygen single bond which easily split into reactive radicals via hemolytic cleavage. Azo compounds have R—N=N—R functional group which can decompose to nitrogen gas and two organic radicals. In both of these cases, the radicals can catalyze the polymerization of acrylate, alkenyl and alkynyl bonds. Examples of peroxide and azo compounds are di-tert-butyl peroxide, 2,2-Bis(tert-butylperoxy)butane, tert-Butyl peracetate, 2,5-Di(tert-butylperoxy)-2,5-dimethyl-3-hexyne, Dicumyl peroxide, Benzoyl peroxide, Di-tert-amyl peroxide, tert-Butyl peroxybenzoate, 4,4'-Azobis(4-cyanopentanoic acid), 2,2'-Azobis(2- amidinopropane) dihydrochloride, diphenyldiazene, Diethyl azodicarboxylate and 1,1'-Azobis(cyclohexanecarbonitrile) to mention a few Photoinitiators are compounds that decompose to free radicals when exposed to light and therefore can promote polymerization of acrylate, alkenyl and alkynyl compounds. Commercial examples of these photoinitiators are Irgacure 149, Irgacure 184, Irgacure 369, Irgacure 500, Irgacure 651, Irgacure 784, Irgacure 819, Irgacure 907, Irgacure 1700, Irgacure 1800, Irgacure 1850, Irgacure 2959, Irgacure 1173, Irgacure 4265 manufactured by BASF.

One method to incorporate curing agent to the system is to attach a curing agent or a functional group that can act as curing agent, to a silane monomer. Therefore the curing agent will accelerate curing of the siloxane polymer. Examples of these kind of curing agents attached to a silane monomer are to γ-Imidazolylpropyltriethoxysilane, γ-Imidazolylpropyltrimethoxysilanel, 3-mercaptopropyltrimethoxysilane, 3-mercaptopropyltriethoxysilane, 3-(triethoxysilyl) propylsuccinicanhydride, 3-(trimethoxysilyl) propylsuccinicanhydride, 3-aminopropyltrimethoxysilane and 3-aminopropyltriethoxysilane to mention a few.

An adhesion promoter can be part of the composition and can be any suitable compound that can enhance adhesion between cured product and surface where product has been applied. Most commonly used adhesion promoters are functional silanes where alkoxysilanes and one to three functional groups. Examples of adhesion promoter used in die attach products can be octyltriethoxysilane, mercaptopropyltriethoxysilane, cyanopropyltrimethoxysilane, 2-(3,4-Epoxycyclohexyl)ethyltrimethoxysilane, 2-(3,4-epoxycyclohexyl)ethyltriethoxysilane, 3-(Trimethoxysilyl) propylmethacrylate, 3-(Trimethoxysilyl)propylacrylate, (3-glycidyloxypropyl)trimethoxysilane, or 3-glycidoxypropyltriethoxysilane, 3-methacryloxypropyltrimethoxysilane and 3-acryloxypropyltrimethoxysilane.

The polymerized siloxane formed will have a [Si—O—Si—O]n repeating backbone, with organic functional groups thereon depending on the silicon containing starting materials. However it is also possible to achieve a [Si—O—Si—C]n or even a [Si—O—Me-O]n (where Me is a metal) backbone.

To obtain [Si—O—Si—C] backbone, a chemical with formula $R^2_{3-a}R^1_aSiR^{11}SiR^1_bR^2_{3-b}$ can be polymerized together with the first, second, and third compounds or any combination of these, as mentioned above, where a is from 1 to 3, b is from 1 to 3, R is a reactive group like explained above, $R^2$ is an alkyl, alkenyl, alkynyl, alcohol, carboxylic acid, dicarboxylic acid, aryl, polyaryl, polycyclic alkyl, hetero cyclic aliphatic, hetero cyclic aromatic group and $R^{11}$ is independently an alkyl group or aryl group, or an oligomer thereof having a molecular weight of less than 1000 g/mol.

Examples of these compound are 1,2-bis(dimethylhydroxylsilyl)ethane, 1,2-bis(trimethoxylsilyl)ethane, 1,2-Bis(dimethoxymethylsilyl)ethane, 1,2-Bis(methoxydimethylsilyl) ethane, 1,2-bis(triethoxylsilyl)ethane, 1,3-bis(dimethylhydroxylsilyl)propane, 1,3-bis(trimethoxylsilyl) propane, 1,3-Bis(dimethoxymethylsilyl)propane, 1,3-Bis(methoxydimethylsilyl) propane, 1,3-bis(triethoxylsilyl) propane, 1,4-bis(dimethylhydroxylsilyl)butane, 1,4-bis(trimethoxylsilyl)butane, 1,4-Bis(dimethoxymethylsilyl) butane, 1,4-Bis(methoxydimethylsilyl) butane, 1,4-bis(triethoxylsilyl)butane, 1,5-bis(dimethylhydroxylsilyl) pentane, 1,5-bis(trimethoxylsilyl)pentane, 1,5-Bis(dimethoxymethylsilyl)pentane, 1,5-bis(methoxydimethylsilyl)pentane, 1,5-bis(triethoxylsilyl) pentane, 1,6-bis(dimethylhydroxylsilyl)hexane, 1,6-bis(trimethoxylsilyl)hexane, 1,6-Bis(dimethoxymethylsilyl) hexane, 1,6-Bis(methoxydimethylsilyl) hexane, 1,6-bis(triethoxylsilyl)hexane 1,4-bis(trimethoxylsilyl)benzene, bis(trimethoxylsilyl)naphthalene, bis(trimethoxylsilyl) anthrazene, bis(trimethoxylsilyl)phenanthere, bis(trimethoxylsilyl)norbornene, 1,4-Bis(dimethylhydroxysilyl) benzene, 1,4-bis(methoxydimethylsilyl)benzene and 1,4-bis(triethoxysilyl)benzene to mention few.

In one embodiment to obtain [Si—O—Si—C] backbone, a compound with formula wherein
$R^3$ is a cross-linking functional group,
$R^4$ is a reactive group, and
$R^5$ is an alkyl, alkenyl, alkynyl, alcohol, carboxylic acid, dicarboxylic acid, aryl, polyaryl, polycyclic alkyl, hetero cyclic aliphatic, hetero cyclic aromatic group,
$R^{12}$ is independently an alkyl group or aryl group, and where c=1 to 2, d=1 to (3−c), e=1 to 2, and f=1 to (3−e),
or an oligomer thereof having a molecular weight of less than 1000 g/mol, is polymerized together with the first, second, third compounds as mentioned herein, or any combinations of these.

Examples of these compounds are 1,2-bis(ethenyldimethoxysilyl)ethane, 1,2-bis(ethynyldimethoxysilyl)ethane, 1,2-bis(ethynyldimethoxy)ethane, 1,2-bis(3-glycidoxypropyldimethoxysilyl)ethane, 1,2-bis[2-(3,4-Epoxycyclohexyl) ethyldimethoxysilyl]ethane, 1,2-bis(propylmethacrylatedimethoxysilyl)ethane, 1,4-bis(ethenyldimethoxysilyl) benzene, 1,4-bis(ethynyldimethoxysilyl)benzene, 1,4-bis (ethynyldimethoxysilyl)benzene, 1,4-bis(3-glycidoxypropyl dimethoxysilyl)benzene, 1,4-bis[2-(3,4-epoxycyclohexyl) ethyldimethoxysilyl]benzene, 1,4-bis(propyl methacrylate-dimethoxysilyl)benzene, to mention few.

In one embodiment a siloxane monomer with molecular formula wherein
$R^1$ is reactive group like explained above,
$R^2$ is alkyl or aryl like explained above,
$R^3$ is cross linking functional group like explained above and a=0 to 3, b=0 to 3,
is polymerized with previously mentioned silanes or added as an additive to the final formulation.

Examples of these compounds are 1,1,5,5-tetramethoxy-1,5-dimethyl-3,3-diphenyltrisiloxane, 1,1,5,5-tetramethoxy-1,3,3,5-tetraphenyltrisiloxane, 1,1,5,5-tetraethoxy-3,3-diphenyltrisiloxane, 1,1,5,5-tetramethoxy-1,5-divinyl-3,3-diphenyltrisiloxane, 1,1,5,5-tetramethoxy-1,5-dimethyl-3,3-diisopropyltrisiloxane, 1,1,1,5,5,5-hexamethoxy-3,3-diphenyltrisiloxane, 1,5-dimethyl-1,5-diethoxy-3,3-diphenyltrisiloxane, 1,5-bis(mercaptopropyl)-1,1,5,5-tetramethoxy-3,3-diphenyltrisiloxane, 1,5-divinyl-1,1,5,5-tetramethoxy-3-phenyl-3-methyltrisiloxane, 1,5-divinyl-1,1,5,5-tetramethoxy-3-cyclohexyl-3-methyltrisiloxane, 1,1,7,7-tetramethoxy-1,7-divinyl-3,3,5,5-tetramethyltetrasiloxane, 1,1,5,5-tetramethoxy-3,3-dimethyltrisiloxane, 1,1,7,7-tetraethoxy-3,3,5,5-tetramethyltetrasiloxane, 1,1,5,5-tetraethoxy-3,3-dimethyltrisiloxane, 1,1,5,5-tetramethoxy-1,5-[2-(3,4-epoxycyclohexyl)ethyl]-3,3-diphenyltrisiloxane, 1,1,5,5-tetramethoxy-1,5-(3-glycidoxypropyl)-3,3-diphenyltrisiloxane, 1,5-dimethyl-1,5-dimethoxy-1,5-[2-(3, 4-epoxycyclohexyl)ethyl]-3,3-diphenyltrisiloxane, 1,5-dimethyl-1,5-dimethoxy-1,5-(3-glycidoxypropyl)-3,3-diphenyltrisiloxane to mention few examples.

An additive added to the composition (after polymerization of the siloxane material as noted above) can be a silane compound with formula of $$R^1_a R^2_b SiR^3_{4-(a+b)}$$

wherein
$R^1$ is reactive group like hydroxyl, alkoxy or acetyloxy,
$R^2$ is alkyl or aryl group,
$R^3$ is crosslinking compound like epoxy, oxetane, alkenyl, acrylate or alkynyl group,
a=0 to 1 and b=0 to 1.

Examples of such additives are tri-(3-glycidoxypropyl)phenylsilane, tri-[2-(3,4-epoxycyclohexyl)ethyl]phenylsilane, tri-(3-methacryloxypropyl)phenylsilane, tri-(3-acryloxypropyl)phenylsilane, tetra-(3-glycidoxypropyl)silane, tetra-[2-(3,4-epoxycyclohexyl)ethyl]silane, tetra-(3-methacryloxypropyl)silane, tetra-(3-acryloxypropyl)silane, tri-(3-glycidoxypropyl)p-tolylsilane, tri-[2-(3,4-epoxycyclohexyl)ethyl]p-tolylsilane, tri-(3-methacryloxypropyl)p-tolylsilane, tri-(3-acryloxypropyl)p-tolylsilane, tri-(3-glycidoxypropyl)hydroxylsilane, tri-[2-(3,4-epoxycyclohexyl)ethyl]hydroxylsilane, tri-(3-methacryloxypropyl)hydroxylsilane, tri-(3-acryloxypropyl)hydroxylsilane.

The additives can be also any organic or silicone polymers that may react or may not react with the main polymer matrix therefore acting as plasticizer, softener, or matrix modifier like silicone. The additive can be also an inorganic polycondensate such as SiOx, TiOx, AlOx, TaOx, HfOx, ZrOx, SnOx, polysilazane.

The particulate filler may be a conductive material, such as carbon black, graphite, graphene, gold, silver, copper, platinum, palladium, nickel, aluminum, silver plated copper, silver plated aluminum, bismuth, tin, bismuth-tin alloy, silver plated fiber, nickel plate copper, silver and nickel plated copper, gold plated copper, gold and nickel plated copper, or it may be gold, silver-gold, silver, nickel, tin, platinum, titanium plated polymer such as polyacrylate, polystyrene or silicone but not limited to these. The filler can be also a semiconductor material such as silicon, n or p type doped silicon, GaN, InGaN, GaAs, InP, SiC but not limited to these. Furthermore, the filler can be quantum dot or a surface plasmonic particle or phosphor particle. Other semiconductor particles or quantum dots, such as Ge, GaP, InAs, CdSe, ZnO, ZnSe, TiO2, ZnS, CdS, CdTe, etc. are also possible.

The filler can be particles that are any suitable metal or semi-metal particles such as those selected from gold, silver, copper, platinum, palladium, indium, iron, nickel, aluminum, carbon, cobalt, strontium, zinc, molybdenum, titanium, tungsten, silver plated copper, silver plated aluminum, bismuth, tin, bismuth-tin alloy, silver plated fiber or alloys or combinations of these. Metal particles that are transition metal particles (whether early transition metals or late transition metals) are envisioned, as are semi metals and metalloids. Semi-metal or metalloid particles such as arsenic, antimony, tellurium, germanium, silicon, and bismuth are envisioned.

Or alternatively it may be an electrically nonconductive material, such as silica, quartz, alumina, aluminum nitride, aluminum oxide coated with silica, barium sulfate, alumina trihydrate, boron nitride, etc. The fillers can be the form of particles or flakes, and can be micro-sized or nano-sized. The filler may comprise ceramic compound particles that are nitrides, oxynitrides, carbides, and oxycarbides of metals or semimetals are possible. In particular, the filler can be particles that are ceramic particles that are an oxide of silicon, zinc, aluminum, yttrium, ytterbium, tungsten, titanium silicon, titanium, antimony, samarium, nickel, nickel cobalt, molybdenum, magnesium, manganese, lanthanide, iron, indium tin, copper, cobalt aluminum, chromium, cesium or calcium.

Also possible are particles that comprise carbon and are selected from carbon black, graphite, graphene, diamond, silicon carbonitride, titanium carbonitride, carbon nanobuds and carbon nanotubes. The particles of the filler can be carbide particles, such as iron carbide, silicon carbide, cobalt carbide, tungsten carbide, boron carbide, zirconium carbide, chromium carbide, titanium carbide, or molybdenum carbide. The particles could instead be nitride particles, such as aluminum nitride, tantalum nitride, boron nitride, titanium nitride, copper nitride, molybdenum nitride, tungsten nitride, iron nitride, silicon nitride, indium nitride, gallium nitride or carbon nitride.

Particles of any suitable size can be used, depending upon the final application. In many cases small particles having an average particle size of less than 100 microns, and preferably less than 50 or even 20 microns are used. Sub-micron particles, such as those less than 1 micron, or e.g. from 1 to 500 nm, such as less than 200 nm, such as from 1 to 100 nm, or even less than 10 nm, are also envisioned. In other examples, particles are provided that have an average particle size of from 5 to 50 nm, or from 15 to 75 nm, less than 100 nm, or from 50 to 500 nm. Particles that are not elongated, e.g. substantial spherical or square, or flakes with a flattened disc shaped appearance (with smooth edges or rough edges) are possible, as are elongated whiskers, cylinders, wires and other elongated particles, such as those having an aspect ratio of 5:1 or more, or 10:1 or more.

Very elongated particles, such as nanowires and nanotubes having a very high aspect ratio are also possible. High aspect ratios for nanowires or nanotubes can be at 25:1 or more, 50:1 or more, or even 100:1 or more. The average particle size for nanowires or nanotubes is in reference to the smallest dimension (width or diameter) as the length can be quite long, even up to centimeters long. As used herein, the term "average particle size" refers to the D50 value of the cumulative volume distribution curve at which 50% by volume of the particles have a diameter less than that value.

The particles can be a mixture of particles as mentioned elsewhere herein, where a first group of particles having an average particle size of greater than 200 nm are provided together with a second group of particles that have an average particle size of less than 200 nm, e.g. where the first group has an average particle size of greater than 500 nm and the second group has an average particle size of less than 100 nm (e.g. average particle size of first group greater than 1 micron, particle size of second group less than 50 nm, or even less than 25 nm). The smaller particles have a lower melting point than the larger particles and melt or sinter at a temperature less than particles or mass of the same material having a plus micron size. In one example, the smaller particles have an average particle size of less than 1 micron and melt or sinter at a temperature less than the bulk temperature of the same material.

Depending upon the particle material selected, and the average particle size, the melting and sintering temperatures will be different.

As one example, very small silver nanoparticles can melt at less than 120° C., and sinter at even lower temperatures. As such, if desired, the smaller particles can have a melting or sintering temperature equal to or lower than the polymer curing temperature, so as to form a web of melted or sintered particles connecting the larger particles together prior to full cross-linking and curing of the siloxane polymeric material. In one example, the smaller particles are melted or sintered with the larger particles at a temperature of less than 130° C., e.g. less than 120° C., or even sintered at less than 110° C., whereas the siloxane material undergoes substantial cross-linking at a higher temperature, e.g. substantial sintering or melting at less than 110° C., but substantial polymerization at greater than 110° C. (or e.g. substantial sintering or melting at less than 120° C. (or 130° C.), but substantial polymerization at greater than 120° C. (or 130° C.). The sintering or melting of the smaller particles prior to substantial polymerization of the siloxane material, allows for greater interconnectivity of a formed metal "lattice" which increases the final electrical conductivity of the cured layer. Substantial polymerization prior to substantial sintering or melting of the smaller particles decreases the amount of formed metal "lattice" and lowers the electrical conductivity of the final cured layer.

Of course, it is also possible to provide only the particles of the smaller average particle size, e.g. sub micron size, which can still achieve the benefits of lower sintering and melting points as compared to the same bulk material (or the same particles having an average particle size of greater than 1 micron for example).

To enhance the coupling with filler and siloxane polymer, a coupling agent can be used. This coupling agent will increase the adhesion between filler and polymer and therefore can increase thermal and/or electrical conductivity of the final product. The coupling agent can be any silane monomer with a formula of wherein
$R^{13}$ is a reactive group like halogen, hydroxyl, alkoxy, acetyl or acetyloxy,
$R^{14}$ is alkyl or aryl group and
$R^{15}$ is a functional group including like epoxy, anhydride, cyano, oxetane, amine, thiol, allyl, alkenyl or alkynyl,
h=0 to 4, 1=0 to 4, j=0 to 4 and h+i+j=4.

The coupling agent can be either mixed directly with filler, siloxane polymer, curing agent, and additives when final product is prepared or the filler particles can be treated by the coupling agent before they are mixed with particles.

If the particles are treated with coupling agent before using them in the final formulation, different methods like deposition from alcohol solution, deposition from aqueous solution, bulk deposition onto filler and anhydrous liquid phase deposition can be used. In the deposition from alcohol solution, alcohol/water solution is prepared and the solution pH is adjusted to slightly acidic (pH 4.5-5.5). Silane is added to this solution and mixed for few minutes to allow partly hydrolyzing. Then filler particles are added and the solution is mixed from to RT to refluxing temperature for different time periods. After mixing, the particles are filtered, rinsed with ethanol and dried in an oven to obtain surface treated particles by the coupling agent. Deposition from aqueous solution is similar compared to deposition from alcohol solution but instead of alcohol, pure water is used as a solvent. pH is again adjusted by acid if non amine functionalized is used. After mixing particles with water/silane mixture, the particles are filtered, rinsed and dried.

Bulk deposition method is a method where silane coupling agent is mixed with solvent without any water or pH adjustment. The filler particles are coated with the silane alcohol solution using different methods like spray coating and then dried in an oven.

In the anhydrous liquid phase deposition, silane are mixed with organic solvent like toluene, tetrahydrofuran or hydrocarbon and filler particles are refluxed in this solution and the extra solvent is removed by vacuum or filtering. The particles can be also dried afterwards in an oven but it is not sometimes need due to direct reaction between particles and filler under refluxing conditions.

Examples of such silane coupling agents are bis (2-hydroxyethyl)-3-aminopropyltriethoxysilane, Allyltrimethoxysilane, N-(2-Aminoethyl)-3-aminopropylmethyldimethoxysilane, N-(2-Aminoethyl)-3-aminopropyltrimethoxysilane, 3-Aminopropylmethyldiethoxysilane. 3-Aminopropyltriethoxysilane, 3-Aminopropyltrimethoxysilane, (N-Trimethoxysilylpropyl)polyethyleneimine, Trimethoxysilylpropyldiethylenetriamine, Phenyltriethoxysilane, Phenyltrimethoxysilane, 3-Chloropropyltrimethoxysilane, 1-Trimethoxysilyl-2(p,m-chloromethyl)phenylethane, 2-(3, 4-Epoxycyclohexyl)ethyltrimethoxysilane, 3-Glycidoxypropyltrimethoxysilane, Isocyanatepropyltriethoxysilane, Bis[3-(triethoxysilyl)propyl]tetrasulfide, 3-Mercaptopropylmethyldimethoxysilane, 3-Mercaptopropyltrimethoxysilane, 3-Methacryloxypropyltrimethoxysilane, 2-(Diphenylphosphino)ethyltriethoxysilane, 1,3-Divinyltetramethyldisilazane, Hexamethyldisilazane, 3-(N-Styrylmethyl-2-aminoethylamino)propyltrimethoxysilane, N-(Triethoxysilylpropyl)urea, 1,3-Divinyltetramethyldisilazane, Vinyltriethoxysilane and Vinyltrimethoxysilane to mention a few.

Depending on the type of particles added, the siloxane-particle cured final product can be a layer or film that is thermally conductive, such as having a thermal conductivity, after final heat or UV curing, of greater than 0.5 watts per meter kelvin (W/(m·K)). Higher thermal conductivity materials are possible, depending upon the type of particles selected. Metal particles in the siloxane composition can result in a cured final film having a thermal conductivity greater than 2.0 W/(m·K), such as greater than 4.0 W/(m·K), or even greater than 10.0 W/(m·K). Depending upon the final application, much higher thermal conductivity may be desired, such as greater than 50.0 W/(m·K), or even greater than 100.0 W/(m·K). However in other applications, particles may be selected to result, if desired, in a material having low thermal conductivity.

Also, if desired the final cured product can have low electrical resistivity, such as less than $1\times10^{-3}$ Ω·m, preferably less than $1\times10^{-4}$ Ω·m, and more preferably $1\times10^{-5}$ Ω·m. Also the sheet resistance of a deposited thin film is preferably less than 100,000, more preferably less than 10,000. However a number of desired final uses of the material may have high electrical resistivity.

In some cases, particularly if the composition will be applied in a device that requires optical characteristics, though it may be desirable in some cases for the final cured siloxane to have optically absorbing properties, it is more likely that the material would desirably be highly transmissive to light in the visible spectrum (or in the spectrum in which the final device is operated), or would desirably be highly reflective to light in the visible spectrum (or in the spectrum in which the device is to be operated). As an example of a transparent material, the final cured layer having a thickness of from 1 to 50 microns will transmit at least 85% of the visible light incident perpendicularly thereto, or preferably transmit at least 90%, more preferably at least 92.5% and most preferably at least 95% As an example of a reflective layer, the final cured layer can reflect at least 85% of the light incident thereon, preferably reflect at least 95% of the light incident thereon at an angle of 90 degrees.

The material of the present invention may also contain a stabilizer and/or an antioxidant. These compounds are added to protect the material from degradation caused by reaction with oxygen induced by such things as heat, light, or residual catalyst from the raw materials.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-d i-tert-butyl-4-hydroxy-phenyl)-propionate]. Commercial examples of antioxidant are for example Irganox 1035, Irganox 1010, Irganox 1076, Irganox 1098, Irganox 3114, Irganox PS800, Irganox PS802, Irgafos 168 manufactured by BASF.

The weight ratio between siloxane polymer and filler is between 100:0 to 5:95 depending of the final use of the product. The ratio between siloxane polymer and cross-linking silicon or non-silicon based resin or oligomer is between 100:0 to 75:25. The amount of curing agent calculated from siloxane polymer amount is from 0.1 to 20%. The amount of adhesion promoter based on total amount of formulation is from 0 to 10%. The amount of antioxidant based on total weight of the formulation is from 0 to 5%.

As mentioned above, the siloxane-particle composition can be used in a variety of areas. It can be used as an adhesive or encapsulant in electronics or optoelectronics packaging, LED and OLED front and back end processing, 3D, photovoltaic and display metallization, in place of soldering e.g. solder bumps in semiconductor packaging, printed electronics, OLED low work function cathode ink, ITO replacement ink, metal mesh and other electrodes, high resolution photovoltaic paste, LMO cathode paste, photovoltaics, power electronics and EMI, touch sensor and other displays, heat or UV curable encapsulants or dielectrics, to name a few.

Depending upon the type of curing mechanism and catalyst activation the final formulation is cured usually by heating the material to higher temperature. For example if thermal acid generator is used, the material is placed in oven for specific time period. Also possible is curing with electromagnetic radiation, such as UV light.

The molecular weight of the siloxane polymer formed from polymerization of the first and second compounds is from about 300 to 10,000 g/mol, preferably from about 400 to 5000 g/mol, and more preferably from about 500 to 2000 g/mol. The polymer is combined with particles of any desired size, preferably having an average particle size of less than 100 microns, more preferably less than 50 microns, or even less than 20 microns. The siloxane polymer is added at a weight percent of from 10 to 90%, and the particles are added at a weight percent of from 1 to 90%. If the final use of the siloxane material requires optical transparency, the particles may be ceramic particles added at a lower weight percent, such as from 1 to 20% by weight. If the siloxane material is to be used where electrical conductivity is desired, such as in a semiconductor package, the particles may be metal particles added at from 60 to 95% by weight.

Polymerization of the first and second compounds is performed, and the particles mixed therewith, to form a viscous fluid having a viscosity of from 50 to 100,000 mPa-sec, preferably from 1000 to 75,000 mPa-sec, and more preferably from 5000 to 50,000 mPa-sec. The viscosity can be measured with a viscometer, such as a Brookfield or Cole-Parmer viscometer, which rotates a disc or cylinder in a fluid sample and measures the torque needed to overcome the viscous resistance to the induced movement. The rotation can be at any desired rate, such as from 1 to 30 rpm, preferably at 5 rpm, and preferably with the material being measured being at 25° C.

After polymerization, any additional desired components can be added to the composition, such as particles, coupling agents, curing agents, etc. The composition is shipped to customers as a viscous material in a container, which may be shipped at ambient temperature without the need for cooling or freezing. As a final product, the material can be applied in the variety of uses mentioned above, typically being heat or UV cured to form a solid cured polymeric siloxane layer.

The composition as disclosed herein is preferably without any substantial solvent. A solvent may be temporarily added, such as to mix a curing agent or other additive with the polymerized viscous material. In such a case, the e.g. curing agent is mixed with a solvent to form a fluid material that can then be mixed with the viscous siloxane polymer.

However, as a substantially solvent free composition is desired for shipping to customers, and later application on a customer's device, the solvent that has been temporarily added is removed in a drying chamber.

There may however be trace amounts of solvent remaining that were not able to be removed during the drying process, though the composition is substantially free of solvent. This solvent removal aids in the deposition of the composition disclosed herein, by reducing shrinkage during the final curing process, as well as minimizing shrinkage over time during the lifetime of the device, as well as aiding thermal stability of the material during the lifetime of the device.

Knowing the final application of the composition, the desired viscosity of the composition, and the particles to be included, it is possible to fine tune the siloxane polymer (starting compounds, molecular weight, viscosity, etc.) such that, upon incorporation into the composition having particles and other components, the desired final properties are achieved for subsequent delivery to the customer. Due to the stability of the composition, it is possible to ship the composition at ambient temperature without any substantial change in molecular weight or viscosity, even after a one week, or even one month, time period from making till final use by the customer.

EXAMPLES

The following siloxane polymer examples are given by way of illustration and are not intended to be limitative.

The viscosity of siloxane polymer was measured by Brookfield viscometer (spindle 14). The molecular weight of the polymer was measured by Agilent GPC.

Siloxane polymer i: A 500 mL round bottom flask with stirring bar and reflux condenser was charged with diphenylsilanediol (60 g, 45 mol %), 2-(3,4-Epoxycyclohexyl)ethyl]trimethoxysilane (55.67 g, 36.7 mol %) and tetramethoxysilane (17.20 g, 18.3 mol %). The flask was heated to 80° C. under nitrogen atmosphere and 0.08 g of barium hydroxide monohydrate dissolved in 1 mL of methanol was added dropwise to the mixture of silanes. The silane mixture was stirred at 80° C. for 30 min during the diphenylsilanediol reacted with alkoxysilanes. After 30 min, formed methanol was evaporated off under vacuum. The siloxane polymer had viscosity of 1000 mPas and Mw of 1100.

Siloxane polymer ii: A 250 mL round bottom flask with stirring bar and reflux condenser was charged with diphenylsilanediol (30 g, 45 mol %), 2-(3,4-Epoxycyclohexyl)ethyl]trimethoxysilane (28.1 g, 37 mol %) and dimethyldimethoxysilane (6.67 g, 18 mol %). The flask was heated to 80° C. under nitrogen atmosphere and 0.035 g of barium hydroxide monohydrate dissolved in 1 mL of methanol was added dropwise to the mixture of silanes. The silane mixture was stirred at 80° C. for 30 min during the diphenylsilanediol reacted with alkoxysilanes. After 30 min, formed methanol was evaporated under vacuum. The siloxane polymer had viscosity of 2750 mPas and Mw of 896.

Siloxane polymer iii: A 250 mL round bottom flask with stirring bar and reflux condenser was charged with diphenylsilanediol (24.5 g, 50 mol %), 2-(3,4-Epoxycyclohexyl)ethyl]trimethoxysilane (18.64 g, 33.4 mol %) and tetramethoxysilane (5.75 g, 16.7 mol %). The flask was heated to 80° C. under nitrogen atmosphere and 0.026 g of barium hydroxide monohydrate dissolved in 1 mL of methanol was added dropwise to the mixture of silanes. The silane mixture was stirred at 80° C. for 30 min during the diphenylsilanediol reacted with alkoxysilanes. After 30 min, formed methanol was evaporated under vacuum. The siloxane polymer had viscosity of 7313 mPas and Mw of 1328.

Siloxane polymer iv: A 250 mL round bottom flask with stirring bar and reflux condenser was charged with diphenylsilanediol (15 g, 50 mol %), 2-(3,4-Epoxycyclohexyl)ethyl]trimethoxysilane (13.29 g, 38.9 mol %) and bis(trimethoxysilyl)ethane (4.17 g, 11.1 mol %). The flask was heated to 80° C. under nitrogen atmosphere and 0.0175 g of barium hydroxide monohydrate dissolved in 1 mL of methanol was added dropwise to the mixture of silanes. The silane mixture was stirred at 80° C. for 30 min during the diphenylsilanediol reacted with alkoxysilanes. After 30 min, formed methanol was evaporated under vacuum. The siloxane polymer had viscosity of 1788 mPas and Mw of 1590.

Siloxane polymer v: A 250 mL round bottom flask with stirring bar and reflux condenser was charged with diphenylsilanediol (15 g, 45 mol %), 2-(3,4-Epoxycyclohexyl)ethyl]trimethoxysilane (13.29 g, 35 mol %) and vinyltrimethoxysilane (4.57 g, 20 mol %). The flask was heated to 80° C. under nitrogen atmosphere and 0.018 g of barium hydroxide monohydrate dissolved in 1 mL of methanol was added dropwise to the mixture of silanes. The silane mixture was stirred at 80° C. for 30 min during the diphenylsilanediol reacted with alkoxysilanes. After 30 min, formed methanol was evaporated off under vacuum. The siloxane polymer had viscosity of 1087 mPas and Mw of 1004.

Siloxane polymer vi: A 250 mL round bottom flask with stirring bar and reflux condenser was charged with di-isopropylsilanediol (20.05 g, 55.55 mol %), 2-(3,4-Epoxycyclohexyl)ethyl]trimethoxysilane (20.0 g, 33.33 mol %) and bis(trimethoxysilyl)ethane (7.3 g, 11.11 mol %). The flask was heated to 80° C. under nitrogen atmosphere and 0.025 g of barium hydroxide monohydrate dissolved in 1 mL of methanol was added dropwise to the mixture of silanes. The silane mixture was stirred at 80° C. for 30 min during the diphenylsilanediol reacted with alkoxysilanes. After 30 min, formed methanol was evaporated off under vacuum. The siloxane polymer had viscosity of 150 mPas and Mw of 781.

Siloxane polymer vii: A 250 mL round bottom flask with stirring bar and reflux condenser was charged with di-isobutylsilanediol (18.6 g, 60 mol %) and 2-(3,4-Epoxycyclohexyl)ethyl]trimethoxysilane (17.32 g, 40 mol %). The flask was heated to 80° C. under nitrogen atmosphere and 0.019 g of barium hydroxide monohydrate dissolved in 1 mL of methanol was added dropwise to the mixture of silanes. The silane mixture was stirred at 80° C. for 30 min during the diphenylsilanediol reacted with alkoxysilanes. After 30 min, formed methanol was evaporated off under vacuum. The siloxane polymer had viscosity of 75 mPas and Mw of 710.

In view of the disclosed methods and materials, a stable composition is formed. The composition may have one part that is a siloxane polymer having a [—Si—O—Si—O]n repeating backbone, with alkyl or aryl groups thereon, and functional cross-linking groups thereon, and another part that is particles mixed with the siloxane material, wherein the particles have an average particle size of less than 100 microns, the particles being any suitable particles such as metal, semi-metal, semiconductor or ceramic particles. The composition as shipped to customers may have a molecular weight of from 300 to 10,000 g/mol, and a viscosity of from 1000 to 75000 mPa-sec at 5 rpm viscometer.

The viscous (or liquid) siloxane polymer is substantially free of —OH groups, thus providing increased shelf-life, and allowing for storing or shipping at ambient temperature if desired. Preferably, the siloxane material has no —OH peak detectable from FTIR analysis thereof. The increased stability of the formed siloxane material allows for storage prior to use where there is a minimal increase in viscosity (cross-linking) during storage, such as less than 25% over the period of 2 weeks, preferably less than 15%, and more preferably less than 10% over a 2 week period stored at room temperature. And, the storage, shipping and later application by the customer can be all performed in the absence of a solvent (except for possible trace residues that remain after drying to remove the solvent), avoiding the problems of solvent capture in the layer later formed in the final product, shrinkage during polymerization, mass loss over time during device usage, etc. No substantial cross-linking occurs during shipping and storage, without the application of heat preferably greater than 100° C. or UV light.

The composition as disclosed herein, having a siloxane polymer, particles, and other possible additives such as coupling agents, adhesion promoters, etc. can be shipped as a one component adhesive at room temperature. Typically one component adhesives are shipped at −40° C., or the components are shipped separately (a "two component" adhesive) where the purchaser must mix the different components together and then typically should preferably perform the adhesion within 24 or 48 hours. Typically a component adhesive may not involve mixing multiple components, however once the adhesive is brought from e.g. −40° C. to room temperature, the adhesion should preferably be performed within 24 or 48 hours. In contrast, the composition disclosed herein can be shipped as a one-component adhesive and which can be shipped and stored at room temperature, e.g. shipping and storing for 2 weeks at room temperature without substantial polymerization or other unwanted reactions taking place.

Figure 2:
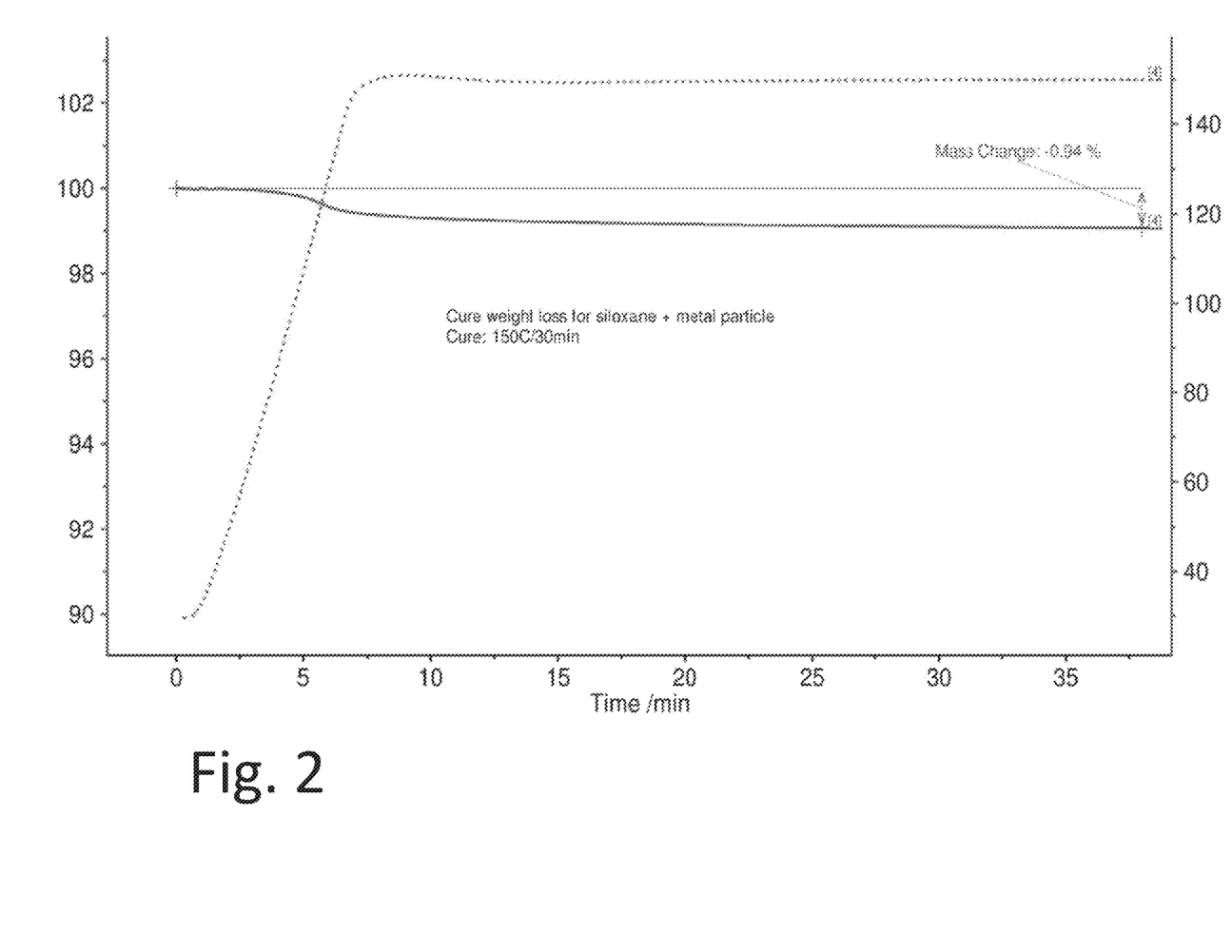
FIG. 2 illustrates mass change of the siloxane polymer during heat induced polymerization.

When the composition is deposited and polymerized, the e.g. the application of heat or UV light, very small shrinkage or reduction in mass is observed. In FIG. 2, the x-axis is time (in minutes), the left y axis is the mass of the layer in terms of % of the starting mass, and the right y-axis is temperature in Celsius. As can be seen in FIG. 2, a siloxane particle mixture as disclosed herein is heated rapidly to 150° C., then held at 150 C for approximately 30 minutes. In this example, the siloxane particle has a Si—O backbone with phenyl group and epoxy groups, and the particles are silver particles. The mass loss is less than 1% after heat curing for over this time period. Desirably the mass loss is typically less than 4%, and generally less than 2% —however in many cases the difference in mass of the siloxane particle composition between before and after curing is less than 1%. The curing temperature is generally at less than 175° C., though higher curing temperatures are possible. Typically the curing temperature will be at 160 C or below, more typically at 150° C. or below. However lower curing temperatures are possible, such as at 125° C. or below.

Figure 3:
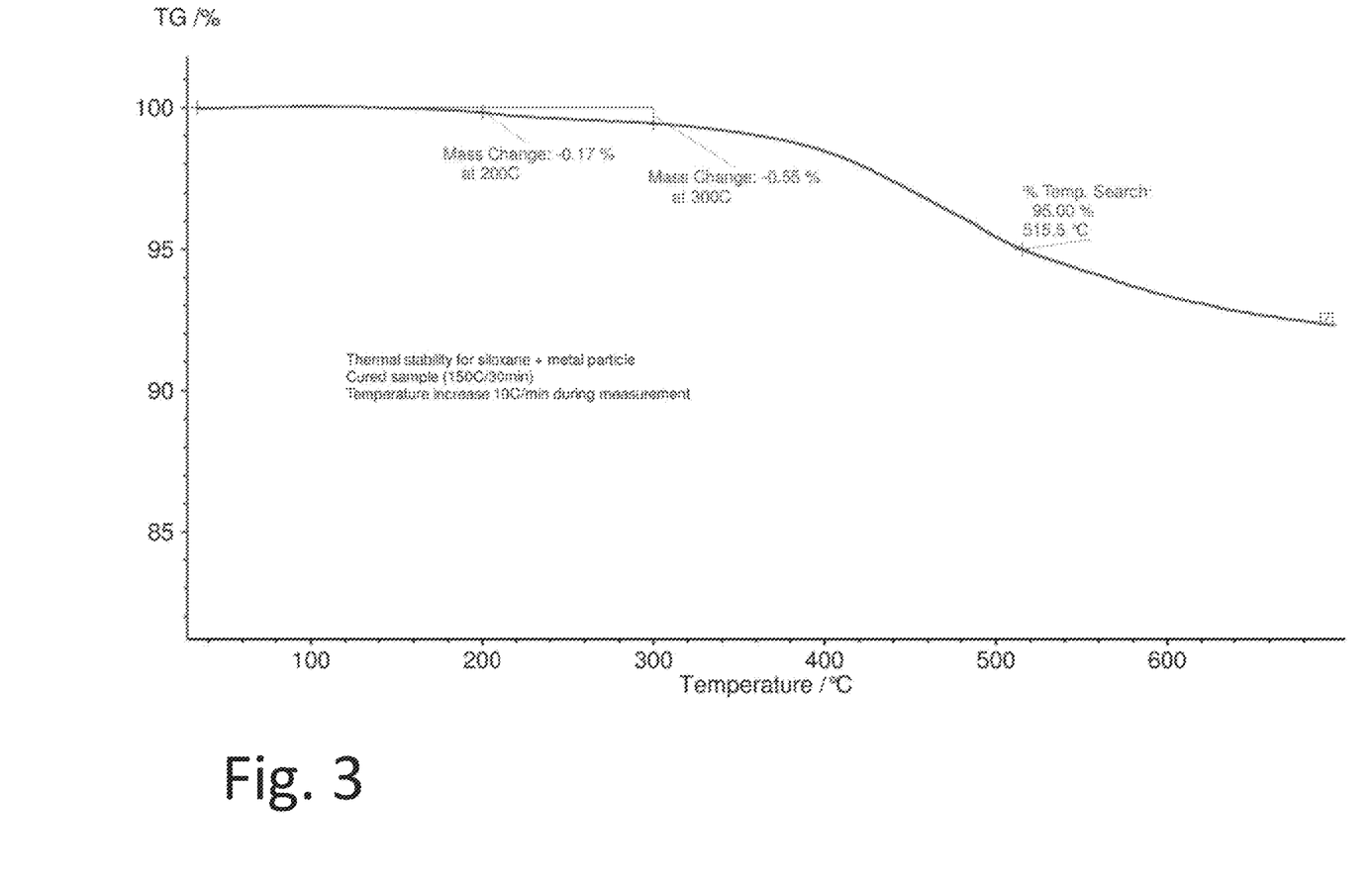
FIG. 3 illustrates the thermal stability of the siloxane material after deposition and polymerization.

As can be seen in FIG. 3, regardless of whether the composition disclosed above is used as an adhesive, as a thermally conductive layer, as an encapsulant, as a patterned electrically conductive layer, a patterned dielectric layer, a transparent layer, a light reflecting layer, etc., once the composition is deposited and polymerized and hardened as desired, the siloxane particle layer or mass is thermally very stable. As an example, heating the in situ material after hardening by heat or UV polymerization up to 600° C. at a ramp rate of 10° C. increase per minute, a mass loss of less than 4.0%, preferably less than 2.0%, e.g. less than 1.0% is observed at both 200° C. and 300° C. (typically a mass loss of less than 0.5% is observed at 200° C., or as in the example of FIG. 3, a mass loss of less than 0.2% at 200 C is observed). At 300 C, a mass loss of less than 1% is observed in the example of FIG. 3, or more particularly less than 0.6%. Similar results can be observed by simply heating the polymerized material for 1 hour at 200° C., or at 300° C. Results of less than 1% mass loss by heating the polymerized deposited material at 375° C. or more for at least 1 hour are possible. As can be seen in FIG. 3, even at temperatures of greater than 500° C., a mass loss of 5% or less is observed. Such a thermally stable material is desirable, particularly one as disclosed herein that can be deposited at low temperatures (e.g. less than 175° C., preferably less than 150° C., or less than 130° C. at e.g. 30 min curing/baking time), or that can be polymerized by UV light.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of this invention as defined in the claims. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

INDUSTRIAL APPLICABILITY

The siloxane composition as disclosed herein has a wide variety of uses. It can be used as a die attach adhesive in a semiconductor device, such as for adhering a microelectronic or optoelectronic device formed on an e.g. silicon substrate to a support or package substrate. The material can be used in a flip chip package to connect bond pads on one substrate to another, as an underfill material or as a protective layer or encapsulant. Depending upon the particles selected, the material can be thermally insulating, and/or can be electrically conductive or insulating. If used within the light path of a device, such as in a display, LED lamp, or photovoltaic cell, the material can be optically transmissive in the visible spectrum.

CITATION LIST

Patent Literature

US 20140100301
CN 103059573
WO 2006112591
WO 2007001039
WO 2008046142
US 20100178478
US 20050244658

Non Patent Literature

JIN, J et al., Silica nanoparticle-embedded sol-gel organic/inorganic hybrid nanocomposite for transparent OLED encapsulation. Organic Electronic, 2012, Vol. 13, pp. 53-57.

What is claimed is:
1. A method of making a composition comprising:
providing a first compound that is a first monomer having the chemical formula $SiR^1_aR^2_{4-a}$ where a is from 1 to 3, $R^1$ is a reactive group, and $R^2$ is an alkyl group or an aryl group, or an oligomer thereof having a molecular weight of less than 1000 g/mol;
providing a second compound having the chemical formula $SiR^3_bR^4_cR^5_{4-(b+c)}$, where $R^3$ is a cross-linking functional group, $R^4$ is a reactive group, and $R^5$ is an alkyl or aryl group, and where b=1 to 2, and c=1 to (4−b), or an oligomer thereof having a molecular weight of less than 1000 g/mol;
mixing the first and second compound with particles having an average particle size of less than 1 micron, wherein the particles comprise a mixture of a first group and a second group of silver nanoparticles, the first group having a smaller particle size than the second group of silver nanoparticles, wherein the first group of silver nanoparticles melts or sinters at a first temperature less than a second temperature at which substantial polymerization of a siloxane polymer from the first and second compound takes place such that a silver latter structure connecting the second group of larger sized silver nanoparticles is formed within the siloxane polymer prior to polymerization of the siloxane polymer, and
polymerizing the first and second compounds together to form a siloxane polymer having the silver lattice structure formed therein.
2. The method of claim 1, wherein the reactive group in the first compound is a hydroxyl, halogen, alkoxy, carboxyl, amine or acyloxy group, and wherein the reactive group in the second compound is a hydroxyl, halogen, alkoxy, carboxyl, amine or acyloxy group.

3. The method of claim 2, wherein the reactive group in the second compound is an alkoxy group having O and methyl, ethyl, n-propyl, isopropyl, n-butyl, isobutyl, t-butyl.

4. The method of claim 1, wherein $R^2$ in the first compound is a polycyclic group, wherein the polycyclic group is selected from adamantyl, dimethyl adamantyl propyl, norbornyl or norbornene, and wherein the polycyclic group is directly attached to the silicon or spaced from the silicon by an alkyl, alkenyl, alkynyl or aryl groups containing 1-12 carbons.

5. The method of claim 1, wherein in the first compound, a=2 and wherein in the second compound, b=1.

6. The method of claim 1, wherein $R^2$ in the first compound is a C1-C6 alkyl group.

7. The method of claim 1, wherein a third compound is combined with the first and second compounds for polymerization, wherein the third compound is a third monomer having the chemical formula $SiR^9{}_f R^{10}{}_g$ where f=1 to 4, and where $R_{10}$ is an alkyl or aryl group and g=4−f, or is an oligomer that is the third monomer having undergone polymerization and having a molecular weight of less than 1000 g/mol, and wherein $R^9$ is methoxy or ethoxy.

8. The method of claim 1, wherein the first compound is a silanediol selected from diphenylsilanediol, dimethylsilanediol, di-isopropylsilanediol, di-n-propylsilanediol, di-n-butylsilanediol, di-t-butylsilanediol, di-isobutylsilanediol and phenylmethylsilanediol.

9. The method of claim 1, wherein the polymerizing of the first and second compounds is performed substantially in the absence of added organic solvent.

10. The method of claim 1, wherein at least one of the reactive groups in the first or second compound is —OH.

11. The method of claim 1, wherein the composition has no substantial —OH groups therein.

12. The method of claim 1, wherein the amount of —OH groups in the first compound is less than the amount of reactive groups in the other compounds that polymerize with the first compounds.

13. A method of making a composition comprising:
providing a first compound that is a first monomer having the chemical formula $SiR^1{}_a R^2{}_{4-a}$ or $R^2{}_{3-a} R^1{}_a SiR^{11} SiR^1{}_a R^2{}_{3-a}$ where a is from 1 to 3, $R^1$ is a reactive group, and $R^2$ is an alkyl group or an aryl group, $R^{11}$ is independently an alkyl group or aryl group,
or an oligomer thereof having a molecular weight of less than 2000 g/mol;
providing a second compound having the chemical formula $SiR^3{}_b R^4{}_c R^5{}_{4-(b+c)}$ or $R^5{}_{3-(b+c)} R^4{}_c R^3{}_b SiR^{12} SiR^3{}_b R^4{}_c R^5{}_{3-(b+c)}$ where $R^3$ is a cross-linking functional group, $R^4$ is a reactive group, and $R^5$ is present and is an alkyl or aryl group, $R^{12}$ is independently an alkyl group or aryl group, and where b=1 to 2, and c=1 to 2,
or an oligomer thereof having a molecular weight of less than 2000 g/mol;
polymerizing the first and second compounds together to form a siloxane polymer; and
mixing the siloxane polymer with a metal, semi-metal or ceramic particles having an average particle size of less than 100 microns.

14. The method of claim 1, wherein in the second compound, $R^5$ is present and is an alkyl or aryl group, and b=1 to 2, and c=1 to 2.

15. The method of claim 13, wherein the particles comprise a first group of particles and a second group of particles, and wherein the second group of particles has a lower melting point than the first group of particles.

* * * * *